(12) United States Patent
Davis et al.

(10) Patent No.: US 8,849,527 B2
(45) Date of Patent: Sep. 30, 2014

(54) SPEED CONTROL FOR A MACHINE WITH A CONTINUOUSLY VARIABLE TRANSMISSION

(71) Applicant: Caterpillar Inc., Peoria, IL (US)

(72) Inventors: Kevin Davis, Washington, IL (US); Adam Nackers, East Peoria, IL (US); Steven Ott, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 85 days.

(21) Appl. No.: 13/666,673

(22) Filed: Nov. 1, 2012

(65) Prior Publication Data

US 2014/0121917 A1    May 1, 2014

(51) Int. Cl.
   *B60W 10/06*    (2006.01)
   *B60W 10/10*    (2012.01)

(52) U.S. Cl.
   USPC ............... 701/54; 701/51; 701/53; 477/37; 477/107

(58) Field of Classification Search
   USPC .................. 701/50, 51, 53, 54; 477/37, 107
   See application file for complete search history.

(56) References Cited

U.S. PATENT DOCUMENTS

| | | | |
|---|---|---|---|
| 4,056,176 A | 11/1977 | Förster et al. | |
| 5,154,267 A | 10/1992 | Watts | |
| 5,389,051 A | 2/1995 | Hirate et al. | |
| 5,526,261 A | 6/1996 | Kallis et al. | |
| 5,871,417 A * | 2/1999 | Suzuki | 477/43 |
| 5,890,991 A * | 4/1999 | Sakakiyama | 701/54 |
| 6,217,477 B1 | 4/2001 | Nobumoto et al. | |
| 6,223,592 B1 | 5/2001 | Genise | |
| 6,240,356 B1 | 5/2001 | Lapke | |
| 6,347,680 B1 | 2/2002 | Mianzo et al. | |
| 6,385,970 B1 | 5/2002 | Kuras et al. | |
| 6,388,407 B1 | 5/2002 | Eguchi | |
| 6,474,186 B1 | 11/2002 | Vollmar | |
| 6,817,338 B2 | 11/2004 | Janic et al. | |
| 7,192,374 B2 | 3/2007 | Kuras et al. | |
| 7,296,496 B2 | 11/2007 | Shah | |
| 7,400,964 B2 | 7/2008 | Shiiba et al. | |
| 7,401,542 B2 | 7/2008 | Stephens et al. | |
| 7,641,588 B2 | 1/2010 | Thomson et al. | |
| 7,669,580 B2 | 3/2010 | Silbernagel et al. | |
| 7,762,923 B2 | 7/2010 | Schuh et al. | |

(Continued)

FOREIGN PATENT DOCUMENTS

| EP | 1640640 A1 | 3/2006 |
|---|---|---|
| JP | 01-244930 A | 9/1989 |
| JP | 2010-078089 A | 4/2010 |

*Primary Examiner* — John Q Nguyen
*Assistant Examiner* — Anshul Sood
(74) *Attorney, Agent, or Firm* — Leydig, Voit & Mayer

(57) ABSTRACT

A machine may include a continuously variable transmission (CVT) operatively coupled to a power source. A virtual gear ratio may be selected from a plurality of virtual gear ratios associated with the CVT. A power source speed may be locked between a minimum power source limit and a maximum power source limit that are associated with the selected virtual gear ratio. If the virtual gear ratio is changed, a controller including one or more control maps may compare the power source speed as locked to the minimum power source limit and the maximum power source limit as they relate to the newly selected virtual gear ratio. If power source speed is outside the minimum or maximum power source limits, the method may limit the power source speed. In some embodiments, the minimum and/or maximum power source limits may vary with respect to the plurality of virtual gear ratios.

20 Claims, 8 Drawing Sheets

(56) References Cited

U.S. PATENT DOCUMENTS

| | | |
|---|---|---|
| 7,894,968 B2 | 2/2011 | Stroh et al. |
| 7,972,240 B2 | 7/2011 | Janasek |
| 8,070,651 B2 | 12/2011 | Eastman et al. |
| 8,216,109 B2 | 7/2012 | Dahl et al. |
| 2004/0193350 A1* | 9/2004 | Pirotais .......................... 701/54 |
| 2008/0172162 A1 | 7/2008 | Wegeng et al. |
| 2009/0088936 A1 | 4/2009 | Hubbard et al. |
| 2009/0112424 A1 | 4/2009 | Dahl et al. |
| 2009/0235627 A1* | 9/2009 | Silbernagel et al. ............ 701/54 |
| 2010/0069196 A1* | 3/2010 | Shibata et al. ..................... 477/3 |
| 2010/0137102 A1 | 6/2010 | Sopko, Jr. et al. |
| 2011/0088961 A1 | 4/2011 | Case et al. |
| 2011/0301793 A1 | 12/2011 | Hsieh et al. |
| 2012/0083976 A1 | 4/2012 | Fleming et al. |
| 2012/0136548 A1 | 5/2012 | Hoff |
| 2013/0131940 A1* | 5/2013 | Yamamoto et al. ............. 701/54 |
| 2013/0260962 A1* | 10/2013 | Li ................................. 477/107 |

\* cited by examiner

SPEED CONTROL FOR A MACHINE WITH A CONTINUOUSLY VARIABLE TRANSMISSION

TECHNICAL FIELD

The present disclosure relates generally to a machine equipped with a continuously variable transmission (CVT) and, more particularly, to a CVT adapted to operate in one or more discrete, virtual gear ratios.

BACKGROUND

Many machines use transmissions to couple the output of a prime mover or power source, for example, an internal combustion engine, to a driven element or device such as wheels or a work implement. Traditional transmissions typically included one or more fixed, selectably engagable gear ratios that could increase or decrease the speed of the prime mover and, usually in an inverse relationship, the torque. Specific gear ratios often correspond to discrete and known speed ranges of the driven device such that selection of a specific gear ratio will enable operation of the driven device within that speed range. Accordingly, changing the desired speed and/or torque may require changing gear ratios that can be done in a step-controlled manner, i.e., gearing up or gearing down. Many operators of these machines have become accustomed to using traditional transmissions because they provide reliability and repeatability in operating the machine and, particularly, the driven device. For example, an operator may know that higher gears are better suited for high-speed, low drag travel and lower gears are better suited for hauling operations or acceleration.

Recently, some manufacturers have equipped certain machines with continuously variable transmissions (CVTs) instead of the conventional, gear-based transmissions. A CVT provides an infinite or continuous range of torque-to-speed output ratios with respect to any given input from the prime mover. In other words, the output of the CVT may be increased or decreased across a continuous range in almost infinitesimally small increments. Thus, a CVT does not engage specific, discrete gear ratios to determine or control its output. However, some operators have expressed discomfort with CVTs because they lack the selectable and predicable gear ratios of conventional gear-based transmissions.

U.S. Pat. No. 7,641,588 ("the '588 patent"), assigned to the assignee of the present application, describes one approach to remedying or reducing operator discomfort and unfamiliarity with CVTs. According to the '588 patent, an electronic or computer-aided controller may be operatively associated with the CVT and/or the prime mover. The controller is configured to regulate or limit operation of those devices within distinct output ranges provided by a plurality of discrete, predetermined speed ranges that an operator may selectively engage. The '588 patent thus provides virtual gear ratios resembling the actual gear ratios employed in conventional transmissions. The present disclosure is directed to furthering implementation and coordination of the virtual gear methodology with CVTs and to improving user operability of machines equipped with such capabilities.

SUMMARY

In accordance with one aspect of the disclosure, there is described a method of regulating speed of a machine including a continuously variable transmission (CVT) operatively coupled to a power source. According to the method, a first virtual gear ratio may be selected from a plurality of virtual gear ratios associated with the CVT. The CVT may be operated at a CVT output speed associated with the first virtual gear ratio as determined from a received operator input signal. Also, a power source speed may be locked between a minimum power source limit and a maximum power source limit as they relate to the first virtual gear ratio. According to the method, the first virtual gear ratio may be shifted to a second virtual gear ratio to change the CVT output speed. If shifted, the method may compare the power source speed as locked to the minimum power source limit and the maximum power source limit as they are related to the second virtual gear ratio. If power source speed is outside the minimum power source limit or the maximum power source limit, the method may limit the power source speed accordingly.

In another aspect, the disclosure describes a machine having a continuously variable transmission (CVT) associated with a plurality of virtual gear ratios. The machine also includes a virtual gear shifter for selecting a virtual gear ratio from the plurality of virtual gear ratios. Operatively coupled to the CVT is a power source. The power source may be associated with a minimum power source limit and a maximum power source limit. The machine may also include a lock mechanism for locking a power source speed between the minimum power source speed and the maximum power source speed for the virtual gear ratio selected. A controller may be in communication with the CVT, virtual gear shifter, power source and lock mechanism. The controller includes a power source map relating the maximum power source limit and the minimum power source limit to the plurality of virtual gear ratios. Furthermore, controller may limit the power source speed between the minimum power source limit and the maximum power source limit if the virtual gear ratio changes.

In yet a further aspect, there is disclosed a method of controlling speed of a machine having a power source operatively coupled to a continuously variable transmission (CVT) associated with a plurality of virtual gear ratios. According to the method, the power source may be locked at a power source speed. The method compares the power source speed as locked to a power source map having a minimum power source limit and a maximum power source limit. The method determines from the comparison a delta representing the difference between the power source speed as locked and at least one of the minimum power source limit and the maximum power source limit. The method then applies the delta to a virtual gear map to determine a CVT output speed.

DETAILED DESCRIPTION

Figure 1:
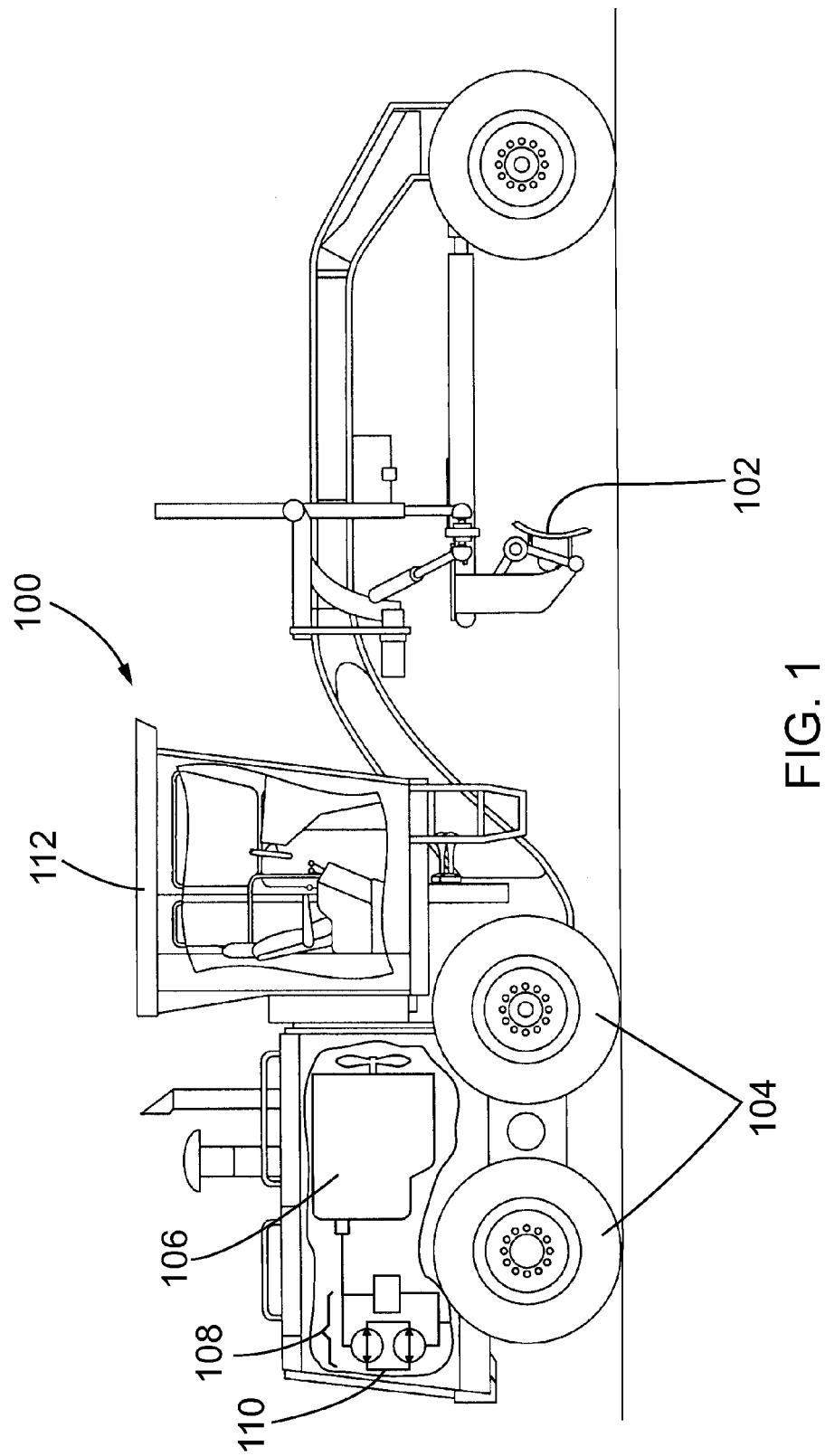
FIG. 1 is a diagrammatical, side elevational view of a mobile machine having a prime mover power source coupled to a driven element through an intermediate CVT.

This disclosure relates to a machine equipped with a continuously variable transmission (CVT) to operatively couple and transfer mechanical power from a prime mover power source to a driven element. CVTs may sometimes be referred to as infinitely variable transmissions (IVTs), however, the disclosure relates to both transmissions and any similar type of transmission regardless of nomenclature. Now referring to FIG. 1, wherein like reference numbers refer to like elements, there is illustrated an embodiment of a machine 100 and in particular a motor grader designed in accordance with the present disclosure. However, the present disclosure is applicable to other types of machines and applications in addition to motor graders. As used herein, the term "machine" may refer to any type machine that performs some operation associated with an industry such as mining, construction, farming, transportation, or any other industry known in the art. For example, the machine may be an earth-moving machine, such as a wheel loader, excavator, dump truck, backhoe, excavator, material handler or the machine may be another type of working machine such as a compactor, paver, etc. Moreover, an implement may be connected to the machine. Such implements may be utilized for a variety of tasks, including, for example, loading, compacting, lifting, brushing, and include, for example, buckets, compactors, fork lifting devices, brushes, grapples, cutters, shears, blades, breakers/hammers, augers, and others. Additionally, the machine may be used in the transportation field such as on-highway trucks, cargo vans, or the like.

The illustrated machine 100 may be capable of alternating between high-speed, over-the-road travel and heavy, load-engaging operation. For example, the machine 100 may include a ground-engaging implement such as a blade 102 that may be power adjusted for flattening or smoothing a worksite surface. The machine 100 is suspended on ground engaging propulsion devices 104 such as wheels that may be disposed toward the front and the rear of the machine. In other machine embodiments, alternative propulsion devices 104 may include continuous tracks, belts, propellers, etc. To propel and direct the machine with respect to the ground, at least one set of the propulsion devices may be power-driven to rotate and/or another set may be steerable by an operator onboard, remotely, or by another control scheme.

Power for driving the propulsion devices and/or the attached implement may be provided by a power source 106, sometimes referred to as a prime mover, that is disposed on the machine. A suitable example of a power source 106 is an internal combustion engine, such as a compression ignition diesel engine, that burns a hydrocarbon-based fuel or another combustible fuel source to convert the potential or chemical energy therein to mechanical power that may be utilized for other work. Other suitable types of power sources 106 may include spark-ignition gasoline engines, turbines, hybrid engines, solar powered engines, and the like. To transfer the mechanical power produced by the power source 106 to the propulsion devices 104, the machine 100 may include a powertrain 108 operatively coupling the power source and the propulsion devices. To adjust the speed and/or torque output of the power source, a CVT 110 may be disposed intermediately in the powertrain 108. The powertrain 108 may also include various shafts, clutches, differentials, and other devices to transmit power and to assist in operation of the machine. Additionally, one or more power takeoffs (PTOs) may engage directly or indirectly with the powertrain 108 to redirect or retransmit a portion of the power to an auxiliary device such as the power-actuated blade 102.

Figure 2:
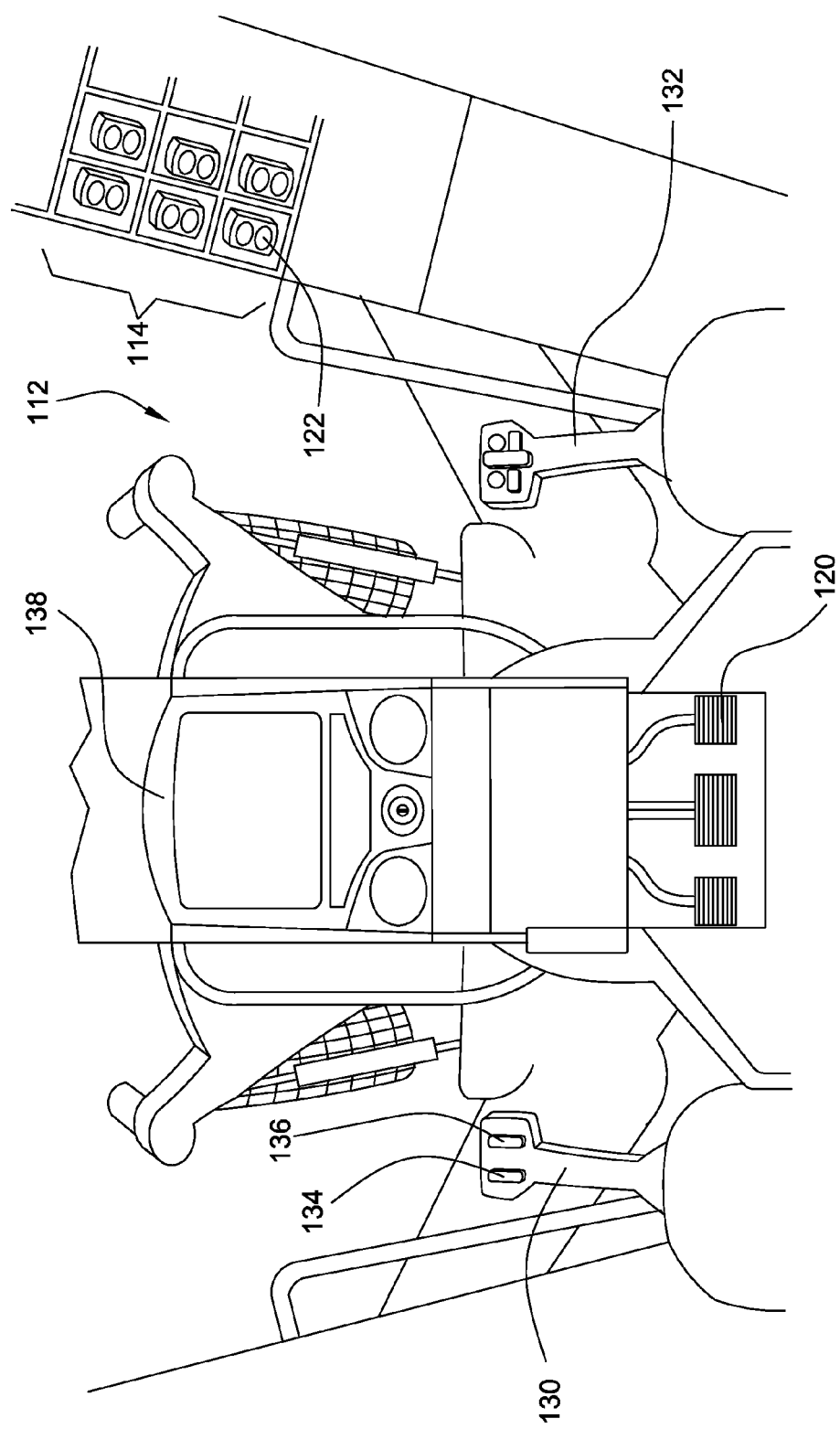
FIG. 2 is a fragmentary perspective view taken from an operator's chair in an operator station for the machine including various accessible, operator-actuated controls and inputs for operating the machine.

To direct operation of the machine 100, an operator station 112 configured to accommodate an operator may be disposed on the machine or remotely in a location that allows visual command over the operating environment. Referring to FIG. 2, various controls and/or inputs 114 with which the operator may interact to maneuver and operate the machine 100 may be accessible inside the operator station 112. The controls and/or inputs illustrated in FIG. 2 are provided by way of example only and may include different arrangements in different embodiments. For example, to control the speed of the machine, a throttle may be provided. In the illustrated embodiment, the throttle may be a first pedal 120 located toward the floor and oriented to the right of the operator station 112 may function as a throttle pedal. The throttle may be of an alternate form, such as, for example, a joystick or a lever. For the purposes of this disclosure, the term pedal 120 is intended to cover all forms of throttles, including, for example, both floor pedals and joysticks, and levers. By modulating the first pedal 120, i.e., depressing or releasing the pedal through a range of displacement, the operator may indicate a desire to accelerate or decelerate the machine so as to increase or decrease the speed or velocity of the machine. The operator may also indicate a desire to maintain a consistent speed or power output of the machine by holding the first pedal 120 at a fixed modulation. In other embodiments, additional pedals may be included that may activate or simulate a clutch, breaks, or the like.

Because the operator may tire or grow fatigued of modulating or holding the first pedal 120 to control and/or maintain the speed of the machine, a lock mechanism 122 may be disposed inside the operator station 112. When the lock mechanism 122 is activated, the operator input being registered by the first pedal 120 may be set or "locked in." The operator may thereafter release the first pedal 120 and operation of the machine will generally continue at the settings and operational arrangements prevailing at the time the operator activated the lock mechanism. If the first pedal 120 is specifically functioning as a throttle pedal, the lock mechanism 122 may function as a throttle lock. Deactivation of the lock mechanism 122 may cause the machine to return to responding to articulation of the first pedal 120 and other controls.

The operator station may 112 include other features and controls for interfacing with and operating the machine. For example, to steer or control the direction of the machine, a first control column or joystick 130 and a second joystick 132 may be disposed to either side of the operator station 112. The operator may grasp and manipulate the joysticks 130, 132 to adjust operation of the machine or it implements. For example, the first joystick 130 may control steering and the second joystick 132 may control an implement. In other embodiments, a steering wheel or other suitable type of control may be included.

Figure 3:
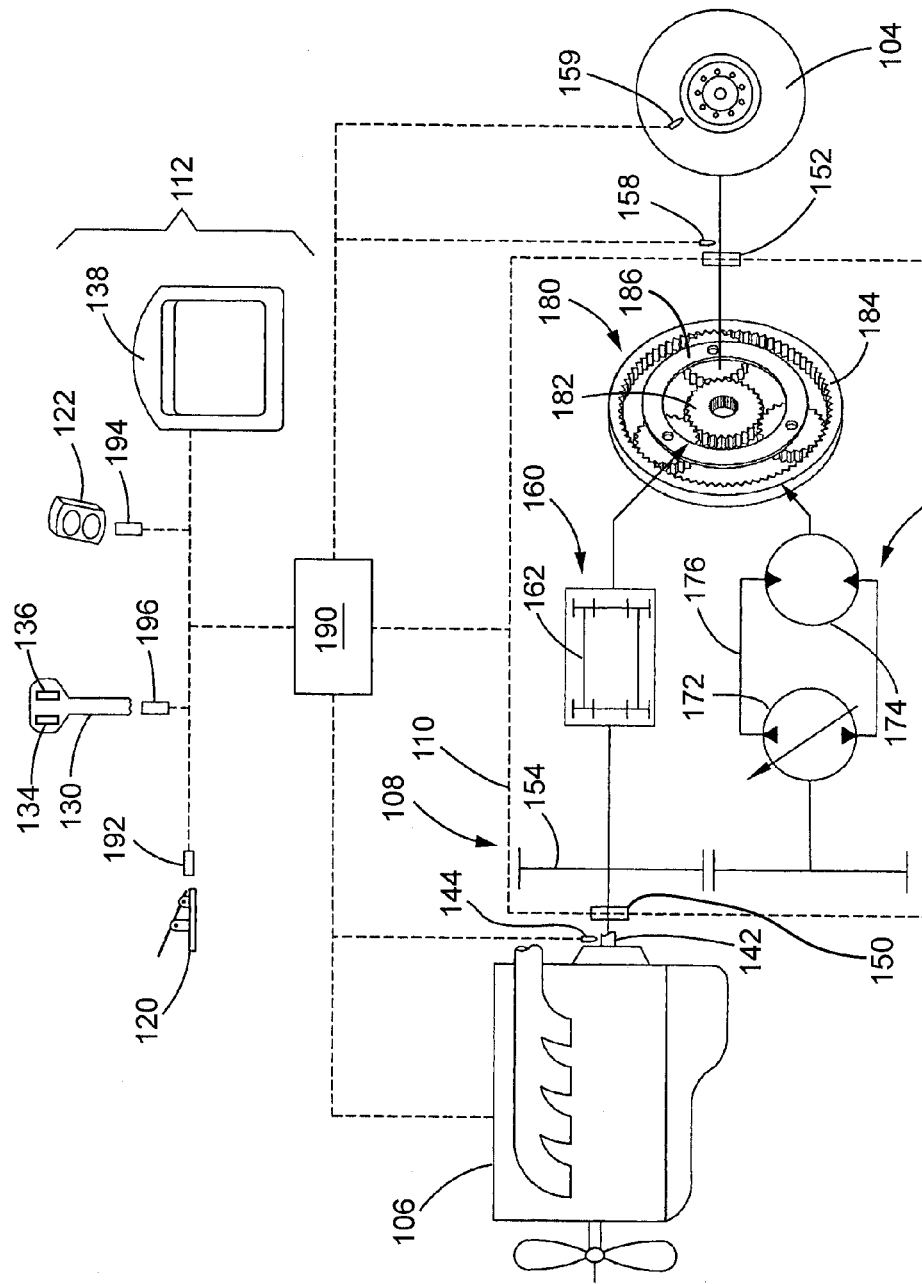
FIG. 3 is a schematic illustration of a powertrain of the machine including an embodiment of a CVT and a controller adapted to operate the CVT using a plurality of virtual gear ratios.

Referring to FIGS. 2 and 3, the operator station 112 may also include inputs, controls and indicators regarding the operation of the CVT that may be disposed in the powertrain 108 to transmit power between the power source 106 and the propulsion devices 102. For example, to change the direction of the machine, a forward-neutral-reverse (F-N-R) selector 134 in the form of a toggle or switch may be disposed in an appropriate accessible location, such as on the first joystick 130. Toggling of the F-N-R selector 134 may change the engagement or operation of the CVT so that the rotary output propels the machine in the forward or reverse direction, or may disengage the CVT 110 so that the machine is in a neutral state. As stated above, the CVT 110 may be associated with a plurality of virtual gears to simulate the operation of conventional gear-based transmissions. To shift between virtual gears, a virtual gear shifter 136 in the form of a roller or slide switch, for example, may be provided on the first joystick 130 or at another appropriate location. Various other type of switches, knobs buttons, dials, levers or the like may be included.

To visually interact with the operator, a visual display 138 including a screen or monitor may be provided in the operator station 112. The visual display 138 may display, for example, information regarding operating parameters, performance characteristics, conditions, and variables regarding various aspects of the machine's operation. Common display information may include speed, direction, power source revolutions-per-minute (RPM), engine load, fuel level, and the like. The visual display 138 may be any suitable type of display including a liquid crystal display (LCD), a cathode ray tube (CRT), a plasma display or the like. Additionally, the visual display 138 may be configured to receive input from the operator through touch-screen technology, soft buttons and so forth. While exemplary operator controls and interfaces are described herein, the operator controls and interfaces may be other than those identified; for example, a fewer or greater number of controls and interfaces may be provided. Moreover, the controls and interfaces may be disposed in the operator station 112 on board the machine 100, or they may be remotely located.

Referring to FIG. 3, an embodiment of the powertrain 108 for transferring mechanical power through the machine is illustrated in more detail. The prime mover power source 106, for example, a diesel-burning internal combustion engine, produces rotational power that may rotate a power source output 142, such as a drive shaft, extending from the power source. The possible speed and torque outputs may, in part, be a function of the engine design including dimensional parameters, displacement, etc. The speed and, in a somewhat related manner, the torque produced by the power source 106 also may be selectively varied. Considering a given engine design and volumetric displacement of the combustion chambers, the speed and power output may be adjusted by increasing or decreasing the quantity of fuel introduced and combusted. Those adjustable parameters may be constrained by the physical limitations of the engine or by constraints imposed during the design of the engine to avoid physical damage.

Figure 4:
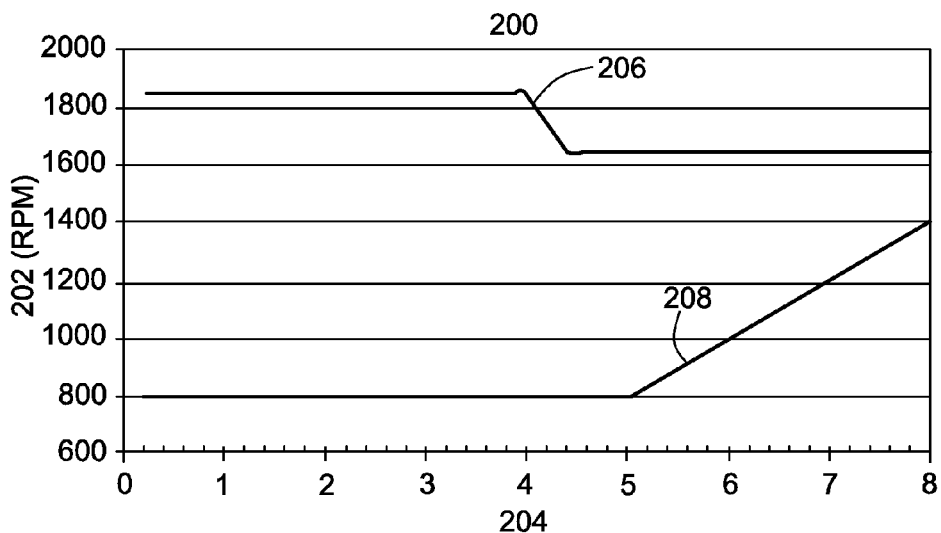
FIG. 4 is chart representing a control map for a power source correlating the power source speed including minimum and maximum power source limits with respect to the plurality of virtual gear ratios.

For example, referring to FIG. 4, there is illustrated a representative power source map 200 for a power source that charts engine or power source speed 202 in RPM on the Y-axis measured against, for example, the plurality of virtual gear ratios 204 on the X-axis. The power source may have a maximum "red-line" speed or maximum power source limit 206 above which it may overheat and seize and a minimum speed or minimum power source limit 208 below which it stalls due to internal friction between its moving parts. To avoid these situations, in some embodiments, controls may be included to prevent the power source from achieving the maximum and minimum speeds. For a diesel-burning internal combustion engine, for example, the maximum or "high idle" speed may generally be about or held at 1850 RPM and the minimum or "low idle" speed may be about or held at 800 RPM. The output speed of the diesel-burning internal combustion engine may be adjusted within these ranges by increasing or decreasing the amount of fuel introduced and combusted in engine.

In addition, the minimum and maximum limits on the speed of the power source may vary upwards or downwards as the operating conditions and performance requirements of the machine change. For example, the maximum power source limit 206 may fall from about 1850 RPM to about 1650 RPM at approximately virtual gear ratio (4). The minimum power source limit 208 may increase steadily from virtual gear ratio (5) onwards to virtual gear ratio (8), for example, to provide sufficient input speed to the CVT so that the CVT output speed is correspondingly high to meet the increasingly higher CVT output speeds associated with higher virtual gear ratios. In other embodiments, different minimum and maximum power source limits may be used, particularly with different types of power sources that may be employed. Between the minimum and maximum power source limits, the power source map 220 provides range of correlation between the available power source speeds and the plurality of virtual gear ratios. This is due in part to the near infinite range of torque-to-speed ratios available from the CVT that may correlate most power source speeds to substantially any virtual gear ratio.

Referring to FIG. 3, to measure, directly or indirectly, the rotational output speed produced by the power source 106, i.e., the power source speed, a power source sensor 144 may be associated with the power source output 142. By way of example, the power source sensor 144 may be a magnetic pickup type sensor that may sense a rotating magnetic field generated by a magnet associated with a rotating component of the power source output 142 such as the drive shaft, flywheel or the like. In other embodiments, the power source sensor 144 may be an optical pickup sensor that optically reads a visual indication on the rotating component. Other systems that may be associated with the power source 106 include fuel systems, air intake systems, exhaust systems, and the like.

To adjust the speed and/or torque of the rotational output produced by the power source 106, for example, by increasing speed and inversely affecting torque, the CVT 110 may be disposed down line of and operatively coupled to the power source output 142. As stated above, the CVT 110 may provide a continuous or infinite number of available torque-to-speed ratios for varying the output from the power source 106. In other words, the CVT 110, which is represented as a dashed-line box, may receive the rotational output though a CVT input member 150 associated with the power source output 142, and modify it in a controlled manner by changing the torque-to-speed ratio across a continuous range or spectrum before transmitting it through a CVT output member 152. To vary the torque-to-speed ratio, one or more operational characteristics of the CVT may be responsively controlled.

In the illustrated embodiment, the CVT 110 may be a split-path, hydromechanical CVT in which the rotational input from the CVT input member 150 is proportionally split into two parallel paths before being recombined at the CVT output member 152. The paths may include a mechanical power-transfer path 160 and a hydrostatic power-transfer path 170 disposed inside the CVT 110. To physically split the rotational input, a path splitter 154 coupled to a shaft of the CVT input member 150 may include a series of parallel, intermeshing gears that may duplicate and offset the rotational axis of the rotary input to align with either or both of the mechanical power-transfer path 160 and the hydrostatic power-transfer path 170.

The mechanical power-transfer path 160 may transfer the rotational power input from the CVT input member 150 to the CVT output member 152 by mechanical, dynamic techniques. For example, the mechanical power-transfer path 160 may embody a multispeed, bidirectional, mechanical transmission with various forward gears, reverse gears and/or clutches. The gears and/or clutches may be arranged in an adjustable and selectively engageable gear train 162 so that predetermined gear combinations may be engaged to produce a discrete output gear ratio. In this manner, the mechanical power-transfer path may function similarly to the traditional gear-based transmissions.

The hydrostatic power-transfer path 170 may transfer the rotational power output from the CVT input member 150 to the CVT output member 152 using fluid mechanics and hydraulics concepts. For example, the hydrostatic power-transfer path 170 may include a hydraulic pump 172 and a hydraulic motor 174 interconnected by a fluid transfer line 176 such as a flexible hydraulic hose that may channel hydraulic fluid. The hydraulic pump 172, which may be a variable displacement pump, swash plate, or the like, may be operatively coupled to the CVT input member 150 and may convert the rotary power input to hydraulic pressure by pressurizing the hydraulic fluid in the fluid transfer line 176. The fluid transfer line directs the pressurized hydraulic fluid to the hydraulic motor 174 to rotate an associated impeller or the like and reconvert the hydraulic pressure to a rotational output. A "gear ratio" or "effective gear ratio" of the hydrostatic power-transfer path 170 may be altered by, for example, varying the displacement of the hydraulic pump 172 or changing the resistance of the fluid transfer line 176. Hydraulic displacement and/or resistance may be varied continuously within the operational limits of the CVT to provide an infinite number of effective gear ratios.

The outputs of the mechanical power-transfer path 160 and a hydrostatic power-transfer path 170 may be recombined using one or more gear assemblies operating in conjunction with the CVT output member 152. For example, the gear assemblies may include a planetary gear 180 including an inner sun gear 182, an outer ring gear 184, and an intermediary carrier 186 operatively engaged with each other. As will be appreciated by those of skill in the art, the interrelationship and the relative rotation of the various gears in a planetary gear may be adjusted to produce a variety of different outputs including reversible outputs. For example, the speed at which ring gear 184 rotates relative to a ground, and the speed at which carrier 186 rotates relative to ring gear 184, may determine a rotational speed of sun gear 182. Accordingly, any combined gear ratio may be achieved by varying the discrete gear ratio of the mechanical power-transfer path 160, the variable gear ratio of the hydrostatic power-transfer path 170, and recombining them at different selected relations in the planetary gear 180, thus changing the output torque and speed characteristics of the CVT 110.

In other embodiments, the CVT may be a purely mechanical CVT using a series of selectable, interrelated gear trains such as the gear train 162 in FIG. 3. The purely mechanical CVT may also be realized as a variable diameter friction pulley system including two or more, parallel, inverted cone-like pulleys interconnected by a belt. An actuator may axially displace the belt with respect to the parallel pulleys to align at different diameters thereby producing variable torque and speed outputs. In other embodiments, the CVT may be a purely hydrostatic CVT similar to the hydrostatic power-transfer path 170 in FIG. 3. Furthermore, the CVT may be an electrical-magnetic CVT including a generator-motor combination. The rotational input may drive the generator to produce electricity that drives the motor to reproduce the rotational output. To continuously vary the torque-to-speed ratio, the electrical resistance between the generator and motor may be adjusted in increasingly small increments. In other embodiments, any other suitable type of CVT may be used.

To measure the rotational output of the CVT 110, a CVT sensor 158, such as a magnet pickup sensor or an optical sensor, may be associated with the CVT output member 152 to sense the rotational speed produced. The powertrain 108 may terminate at a propulsion device 104, such as a rotatable wheel that engages the ground and propels the machine. Various axels, differentials and the like may facilitate the engagement of the powertrain 108 to the wheel. In the embodiment of FIG. 3, a machine speed sensor 159, such as a magnetic pickup or optical sensor, may be associated with the propulsion device. Machine speed, i.e., distance traveled per time, may be calculated by multiplying the revolutions per second of the wheel by the circumference of the wheel. In general, the machine speed should generally directly correspond to the output speed of the CVT. In other words, controlling the output of the CVT determines the machine speed. However, in some cases, the propulsion devices may be slipping, spinning out or hydroplaning with respect to the ground, in which case the measured machine speed may not equal the CVT output speed. In some embodiments, the machine speed sensor 159 or another sensor may be configured to determine if the propulsion devices are not engaging the ground appropriately.

To coordinate and control the various components in the powertrain 108 including the CVT 110, the machine may include an electronic or computerized control unit, module or controller 190. The controller 190 may be adapted to monitor various operating parameters and to responsively regulate various variables and functions affecting the powertrain. The controller 190 may include a microprocessor, an application specific integrated circuit (ASIC), or other appropriate circuitry and may have memory or other data storage capabilities. The controller may include functions, steps, routines, control maps, data tables, charts and the like saved in and executable from read-only memory or another electronically accessible storage medium or computer readable medium to control the engine system. Storage or computer readable mediums may take the form of any media that provide instructions to the controller for execution. The mediums may take the form of non-volatile media, volatile media, and transmission media. Non-volatile media includes, for example, optical or magnetic disks. Volatile media includes dynamic memory. Transmission media includes coaxial cables, copper wire and fiber optics, and can also take the form of acoustic or light waves, such as those generated during radio-wave and infra-red data communications. Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer or processor can read. Although in FIG. 3, the controller 190 is illustrated as a single, discrete unit, in other embodiments, the controller, any associated processors and memory, and their functions may be distributed among a plurality of distinct and separate components. To receive operating parameters and send control commands or instructions, the controller may be operatively associated with and may communicate with various sensors and controls in the operator station 112 and the powertrain 108. Communication between the controller and the sensors may be established by sending and receiving digital or analog signals across electronic communication lines or communication busses. The various communication and command channels are indicated in dashed lines for illustration purposes.

For example, to register a desired increase or decrease in the speed or power output of the machine with respect to the ground, the controller 190 may communicate with a first pedal sensor 192 associated with and registering articulation of the first pedal 120 intended as a throttle register. The first pedal sensor 192 may generate an operator input signal upon modulation of the first pedal 120 and communicate that operator input signal to the controller 190 that may accordingly adjust operation of one or more components in the powertrain 108 to increase or decrease machine speed and/or output. To lock or set the machine speed or output without the need for modulating the first pedal 120, the controller may also communicate with the lock mechanism 122 via a lock mechanism sensor 194. The controller may also communicate with the virtual gear shifter 136 located on the first joystick 130 via a gear shifter sensor 196 to register an operator input indicating a desire to adjust the torque-to-speed ratio of the CVT 110. To interface with and receive other instructions or commands from the operator, the controller 190 may be associated with the visual display 138 and/or other inputs and indicators in the operator station 112. To monitor the output speed and/or torque produced by the power source 106, the controller 190 may communicate with the power source sensor 144. Likewise, to monitor the changes to the torque-to-speed output affected by the CVT 110, and particularly the CVT output speed, the controller may communicate with the CVT sensor 158. In various embodiments, the controller 190 may estimate the actual machine speed based on CVT output speed or may communicate directly with the machine speed sensor 159 to measure the rotational speed of the propulsion device 104.

Figure 5:
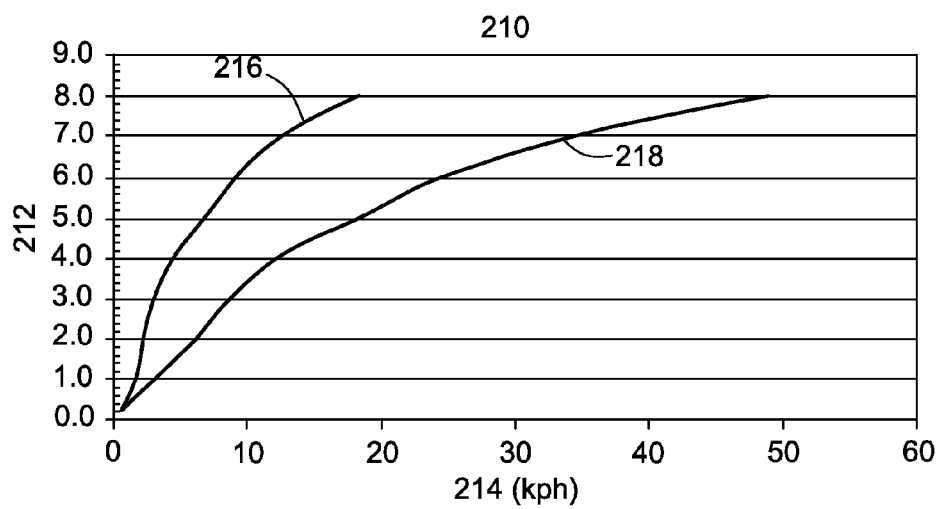
FIG. 5 is a chart representing a control map for a plurality of selectable virtual gear ratios each having a respective range of virtual gear speeds between a minimum speed and maximum speed.

As indicated above, the controller 190 may regulate the output speed and/or torque of the CVT 110 within discrete ranges by associating those ranges with a plurality of operator-selectable virtual gear ratios. Any suitable number of virtual gear ratios may be utilized including fractions or increments of discrete virtual gear ratios. The virtual gear ratios may be associated with the forward and/or reverse directions of the machine. Referring to FIG. 5, there is illustrated a virtual gear map 210 for operating a CVT utilizing a series of virtual gear ratios. The virtual gear ratios 212 may be charted along the Y-axis and the associated CVT output speeds 214, which will generally correspond to the travel speed of the machine and therefore may be measured in kilometers per hour (kph), may be charted along the X-axis. The output speeds the CVT is capable of producing may change for each of the different virtual gear ratios. In an embodiment, the CVT output speeds 214 achievable for each virtual gear ratio 212 may correspond to the speeds achievable for a conventional gear-based transmission. It should be appreciated that CVT output torque may vary inversely with the CVT output speed 214 on the X-axis and the virtual gear ratios 212 charted along the Y-axis.

In the particular example, the virtual gear map 210 may include virtual gear ratios (1) through (8), although in other embodiments, different numbers of virtual gear ratios including fractions of virtual gear ratios may be used. Each virtual gear ratio (1)-(8) has an associated range of virtual gear speeds between a minimum virtual gear speed and a maximum virtual gear speed. For example, virtual gear ratio (2) may have a minimum virtual gear speed of 2 kph and a maximum virtual gear speed of 6 kph for a range of 4 kph. Virtual gear ratio (8) may instead have a minimum virtual gear speed of 18 kph and a maximum virtual gear speed of 50 kph. The operator may adjust the actual speed within the range of virtual gear speeds for the virtual gear ratio selected by modulating the first pedal.

Because the CVT output speed 214 is limited between the minimum virtual gear speed and the maximum virtual gear speed for each virtual gear ratio 212, the effect of shifting between virtual gear ratios therefore changes the output speeds the CVT is cable of producing. A curve plotted through the minimum virtual gear speeds for all the virtual gear ratios produces a minimum CVT speed curve 216 and the plot through the maximum virtual gear speeds for all ratios produces a maximum CVT speed curve 218. Both curves 216, 218 extend to the right indicating greater available CVT output speeds 214 as the virtual gear ratios 212 increase. Accordingly, by shifting upward through the plurality of virtual gear ratios 212, the CVT and thus the machine is capable of increased speeds 214 and a wider range of speeds. The speed ranges for adjacent virtual gear ratios may overlap so that shifting between gear ratios may occur smoothly.

Figure 6:
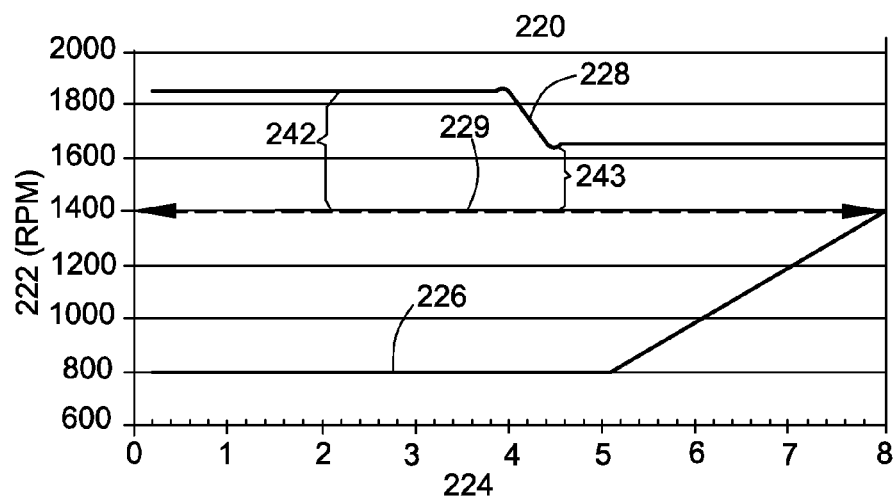
FIG. 6 is a chart representing a power source map similar to that of FIG. 4 illustrating response of the power source when a throttle locking mechanism is activated and the virtual gear ratios are shifted.
Figure 7:
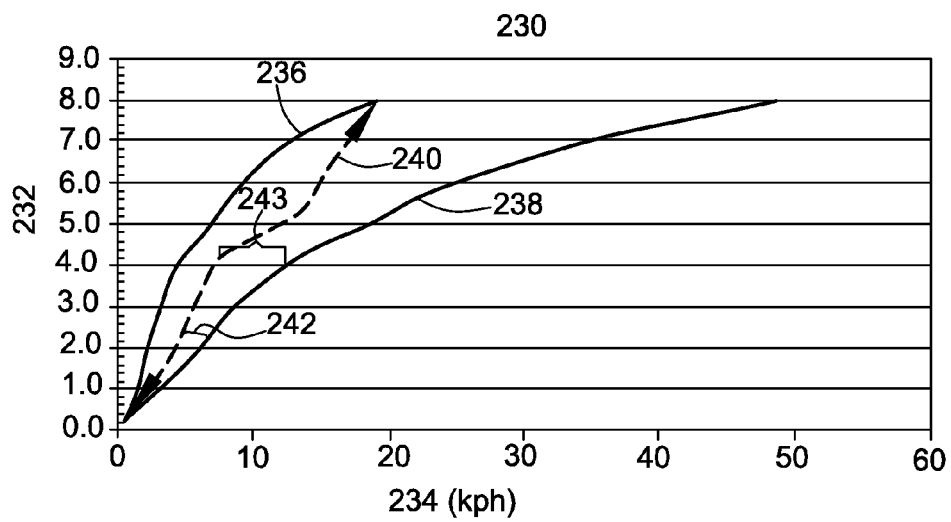
FIG. 7 is a chart representing a virtual gear map similar to that of FIG. 5 illustrating response of the CVT when the throttle locking mechanism is activated and the virtual gear ratios are shifted.

In some embodiments, shifting between virtual gear ratios may occur with the lock mechanism activated. In such instances, the operator may be signaling a desire to increase or decrease the machine speed without having to articulate the first pedal. The controller may regulate operation of the powertrain in a locked manner and within the performance constraints and limitations imposed by the virtual gear methodology and the power source. Referring to FIGS. 6 and 7, there are illustrated a power source map 220 and a virtual gear map 230 representing the response or output of the power source and the CVT when virtual gear ratios change with the lock mechanism is activated. In FIG. 6, the engine or power source speed 222 is charted along the Y-axis in RPM with respect to the plurality of virtual gear ratios 224 charted along the X-axis. Curves reflecting physical or applied limitations of the power source may be indicated by the minimum power source limit 226 and the maximum power source limit 228. As stated above, the minimum and maximum power source limits may also vary by shifting or slopping upward or downwards.

In the illustrated example, the lock mechanism may be activated to lock the power source speed 229 (indicated as a dashed line with arrows) between the minimum and maximum power source limits 226, 228 at, for example, 1400 RPM. In accordance with the throttle locking strategy and within the limits reflected in the power source map 210, the controller may attempt to maintain the locked power source speed 229 even if the virtual gear ratios are shifted. For example, if the virtual gear ratios are shifted from a first virtual gear ratio (1) to a second virtual gear ratio (2) and through to a third virtual gear ratio (8), the activated locking mechanism may attempt to maintain the power source speed 229 at 1400 RPM. Because the power source speed 229 of 1400 RPM applies for all virtual gear ratios 224, i.e., virtual gear ratios (1)-(8), according to the power source map 220, the power source speed will remain at 1400 RPM. Power source map 210 reflects this ability by depicting power source speed 229 as a horizontal line extending across the full plurality of virtual gear ratios 224.

Referring to FIG. 7, the virtual gear map 230 may regulate the operation of the CVT and adjust its output so that the machine is capable of achieving a range of machine speeds. Specifically, the CVT receives the power source output of 1400 RPM and may convert it into an adjustable range of CVT output speeds that are transferred to the propulsion devices and power the machine. To facilitate conversion of power source speed into machine speed, the virtual gear map 230 may correlate the plurality of virtual gear ratios (1)-(8), charted along the Y-axis 232, to the CVT output speeds 234, in kph, charted along the X-axis. The virtual gear map 230 may also include a minimum virtual gear speed and a maximum virtual gear speed for each virtual gear ratio, similar to virtual gear map 210 in FIG. 5. The plot of a line or curve through the minimum virtual gear speeds for each virtual gear ratio produces a minimum CVT speed curve 236 and the plot of the maximum virtual gear speeds produces a maximum CVT speed curve 238. The CVT is regulated to produce a predetermined range of speeds between the minimum CVT speed curve 236 and the maximum CVT speed curve 238. If the operator of the machine shifts or changes the virtual gear ratio 232, control of the CVT is readjusted to provide a different range of predetermined CVT output speeds 234.

If the virtual gear ratios are shifted with the lock mechanism engaged, the CVT may respond by adjusting the speed output from the CVT in accordance with a CVT output speed curve 240 (indicate as a dashed line with arrows) included or plotted in the virtual gear map 230. The CVT output speed curve 240 may be charted between the limits established by the minimum CVT speed curve 236 and the maximum CVT speed curve 238 for each selectable virtual gear ratio. For example, if the virtual gear ratio is shifted from a first virtual gear ratio (2) to second virtual gear ratio (3), the CVT output speed changes from 2 kph to 4 kph in accordance with the CVT output speed curve 240. As another example, if the virtual gear ratio changes from (1) to (4), the CVT output speed may jump from 2 kph to 6 kph. Accordingly, even with the lock mechanism activated and the power source speed locked, the CVT output speed and, relatedly, the machine speed may be adjusted by shifting virtual gear ratios.

In an embodiment, the controller may utilize the power source map 220 including the minimum and maximum power source limits 226, 228 to determine or generate the CVT output speed curve 240. For example, if the power source is locked at the power source speed 229 of 1400 RPM, the controller may determine the difference between the power source speed and the maximum power source limit 228 at the selected virtual gear ratio 224. This difference may be referred to as delta 242. For example, at virtual gear ratio (2), the difference or delta 242 is 1850 RPM−1400 RPM=450 RPM. The controller may convert the delta 242 to a percentage, fraction or ratio of the available power source speed for the selected virtual gear ratio 224. Per the example, at virtual gear ratio (2), the available power source speed range, i.e., the difference between the maximum power source limit 228 and the minimum power source limit 226, is 1850 RPM−800 RPM=1050 RPM. The delta 242 of 450 RPM would therefore be converted to approximately 43% (450 RPM/1050 RPM), which represents the difference between the maximum power source limit 228 and the locked power source speed 229. In alternative embodiments, it will be appreciated that the delta 242 could be calculated using the difference between the minimum power source limit 226 and the locked power source speed 229.

Referring to FIG. 7, to generate the CVT output speed curve 240, the controller may apply the delta 242 to the virtual gear map 230. Because the delta 242 reflects the amount of power that the power source is actually producing, for example, a 43% difference or deduction from the maximum power source limit, the virtual gear map 230 charts the virtual gear speed curve 240 at a 43% offset from the maximum CVT speed curve 238 for the selected virtual gear ratio. In the exemplary embodiment, the CVT output speed curve 240 would correlate to about 4 kph for virtual gear ratio (2). The 4 kph speed also reflects an approximately 43% difference or offset from the maximum virtual gear speed of 6 kph for virtual gear ratio (2). Accordingly, the delta is an interchangeable value that may be derived from and applied to both the power source map 220 and the virtual gear map 230. The delta also keeps the adjustable CVT output speed as constrained by the minimum and maximum speed curves proportional to the locked power source speed as constrained by its minimum and maximum power source limits.

Referring to FIGS. 6 and 7, to account for possible variation in the minimum and maximum power source limits 226, 228 and the locked power source speed 229, the delta may be determined specifically for each virtual gear ratio 224. The recalculated delta may also be applied to each virtual gear ratio in the virtual gear map 230 so that the CVT output speed curve 240 will be proportional to the locked power source speed 229 with respect to the minimum and maximum power source limits 226, 228 including any variations. For example, because the maximum power source limit 228 changes from about 1850 RPM to about 1650 RPM at about virtual gear ratio (4), a new delta 243 or difference between the locked power source speed 229 and the maximum power source limit 228 would be calculated at 250 RPM (i.e. 1650 RPM−1400 RPM). If calculated as a percentage, the delta 243 would change to reflect an approximately 30% difference between the locked power speed 229 and the maximum power source limit 228. When applied to the virtual gear map 230, the new delta 243 causes the virtual gear speed curve 240 to move closer to the maximum CVT speed curve 238 beginning at virtual gear ratio (4). Accordingly, the CVT output speed curve 240 changes to generally reflect or account for the effect of the variations in minimum power source limit 226 and maximum power source limit 228 with respect to the locked power source speed curve 229.

Figure 8:
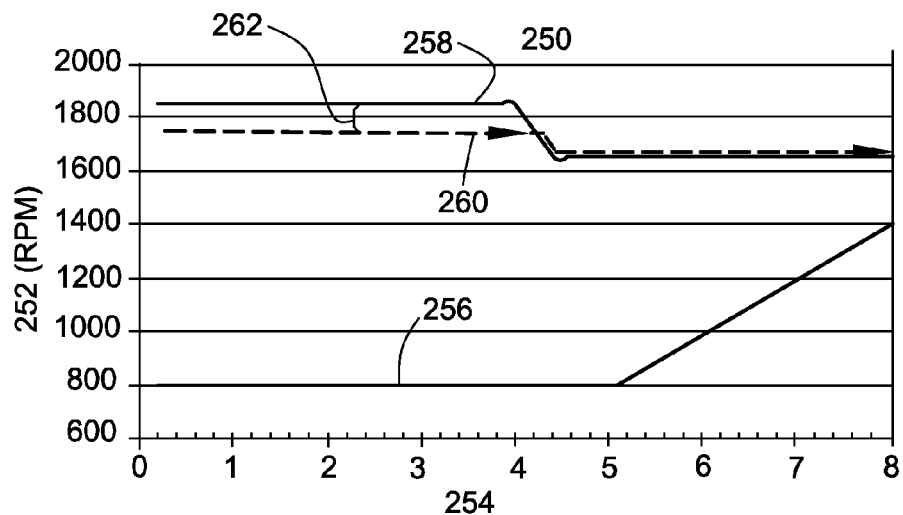
FIG. 8 is a chart representing a power source map similar to that of FIG. 4 illustrating response of the power source when the throttle locking mechanism is activated the power source speed is partially constrained by associated minimum and maximum power source limits.
Figure 9:
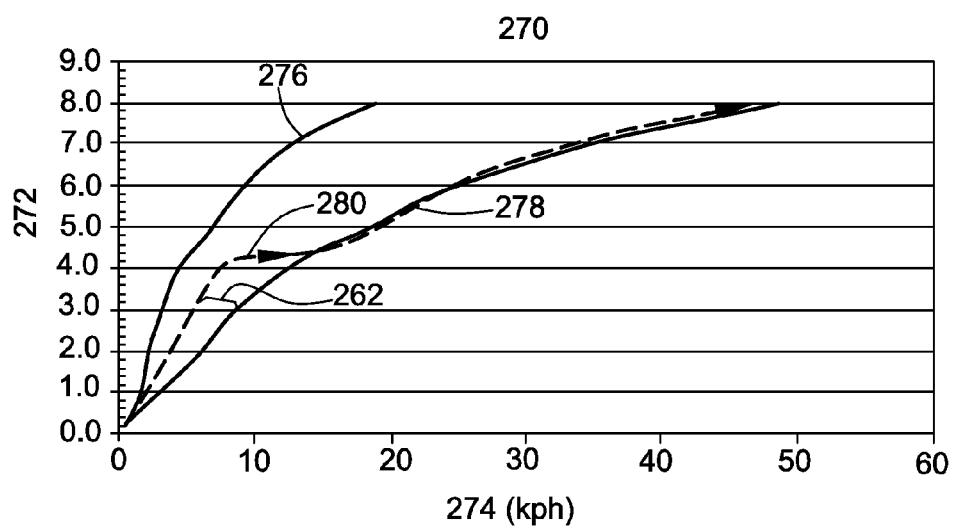
FIG. 9 is a chart representing a virtual gear map similar to that of FIG. 5 illustrating response of the CVT when the throttle locking mechanism is activated and the power source speed is partially constrained.

Referring to FIGS. 8 and 9, there are illustrated other embodiments of a power source map 250 and a virtual gear map 270 reflecting further effects of the minimum and maximum power source limits on virtual gear speed. The power source map 250 in FIG. 8 correlates the power source speed 252 along the Y-axis with the plurality of virtual gear ratios 254 along the X-axis. To reflect the limits of the power source, the power source map 250 includes a curve for the minimum power source limit 256 that is about 800 RPM for virtual gear ratios (1)-(5) then increases upwards to about 1400 RPM at virtual gear ratio (8). The power source map 250 also includes a curve representing the maximum power source limit 258 that may be about 1850 RPM for virtual gear ratios (1)-(4) and that drops to about 1650 RPM for virtual gears ratios (4)-(8). In the illustrated example, the operator may activate the lock mechanism at 1750 RPM which is reflected as power source speed 260 (indicated as a dashed line with arrows). Between virtual gear ratio (1)-(4), the power source speed 260 is below the maximum power source limit 258. Accordingly, if the selected virtual gear ratio is shifted or changed in the range of virtual gear ratios (1)-(4), the power source speed 260 may be maintained or remain locked at 1750 RPM. The controller may determine a difference or delta 262 between the locked power source speed 260 and the maximum power source limit 258 that is calculated as 1850 RPM–1750 RPM or 100 RRM, or about a 10% difference.

Referring to FIG. 9, the virtual gear map 270 correlates the virtual gear ratios 272 on the Y-axis to the CVT output speed 274 in kph on the X-axis. The virtual gear map 270 includes the minimum CVT speed curve 276 and the maximum CVT speed curve 278 based on the minimum and maximum speeds for each virtual gear ratio. The virtual gear map 270 may also plot a curve depicting the CVT output speed curve 280 (indicated as a dashed line with arrows). When the delta 262 of approximately 10% is used to generate the CVT output speed curve 280, the resulting curve extends between the minimum CVT speed curve 276 and the maximum CVT speed curve 278 for virtual gear ratios (1)-(4).

Referring back to FIG. 8, because the maximum power source limit 258 decreases from about 1850 RPM to about 1650 RPM at approximately virtual gear ratio (4), the locked power source speed 260 initially set at 1750 RPM may become limited or constrained for virtual gear ratios (4) and above. Specifically, the power source map 250 sets the power source speed 260 equal to the maximum power source limit for virtual gears (4) and above to reflect the physical or applied limitations imposed by the power source. As reflected in the power source map 250, the curves of power source speed 260 and the maximum power source limit 258 align with each other. Furthermore, because power source speed 260 and the maximum power source limit 258 are equal, the delta 262 decreases to zero and ceases to exist for virtual gear ratios 254 generally above virtual gear ratio (4). In an embodiment, if the CVT is shifted to a virtual gear ratio below virtual gear ratio (4), the power source speed 260 may return to the locked speed of 1750 RPM. To prevent the power source from stalling or under-performing, the minimum power source limit 256 may similarly function to limit the power source speed 260.

Alignment of the maximum power source limit 258 and the power source speed 260 in FIG. 8 may also be reflected in the CVT output speed curve 280 in FIG. 9. Specifically, at approximately virtual gear ratio (4), the CVT output speed curve 280 approaches the maximum CVT speed curve 278 and thereafter the two curves become aligned with each other. Alignment of the two curves in part reflects that the delta 262 determined in the power source map 250 has ceased to exist. Accordingly, the CVT output speed curve 280 will be equivalent to the maximum CVT speed curve 278 for virtual gear ratios 272 generally above virtual gear ratio (4). If the operator downshifts back to virtual gear ratios below (4), the CVT output speed curve 280 may again shift or offset from the maximum CVT speed curve 278. In the alternative scenario, if the power source speed 260 encounters the minimum power source limit 256, the curve of the CVT output speed curve 280 may similarly align with minimum CVT speed curve 276.

Figure 10:
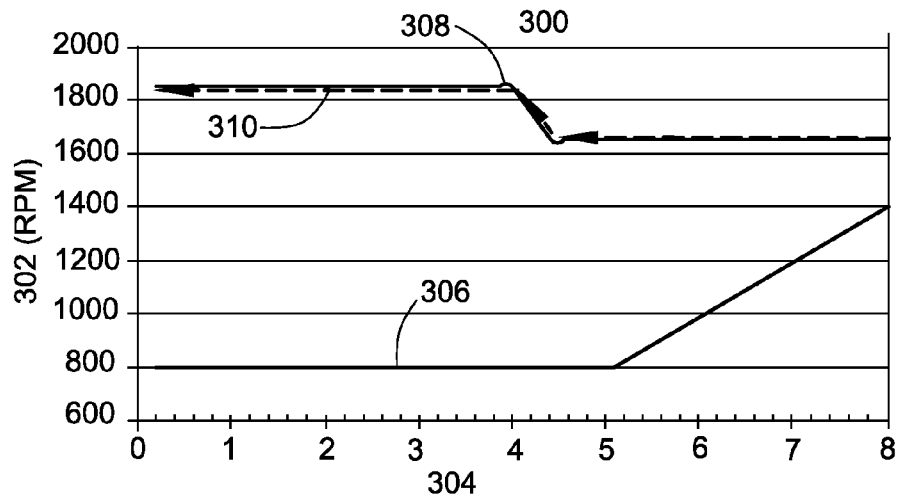
FIG. 10 is a chart representing a power source map similar to that of FIG. 6 illustrating response of the power source when activating the throttle locking mechanism while the power source speed is constrained by the minimum and maximum power source limits.
Figure 11:
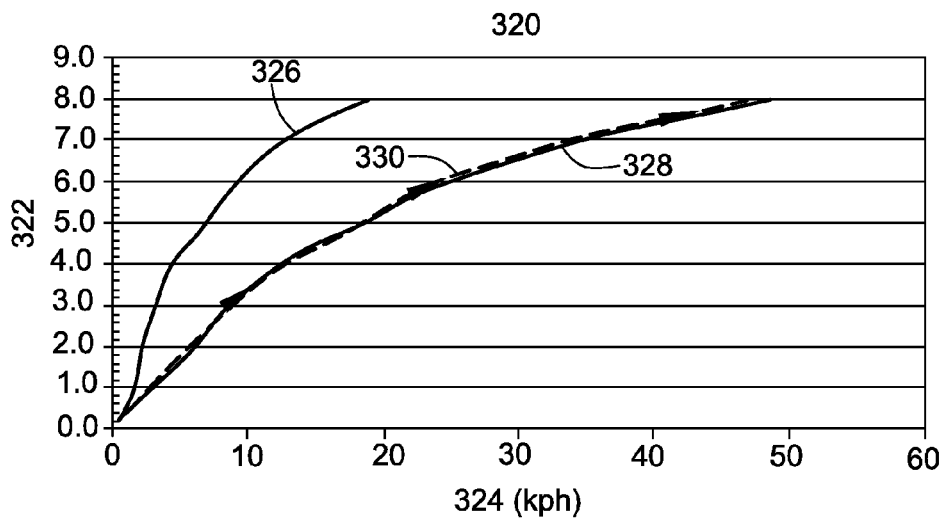
FIG. 11 is a chart representing a virtual gear map similar to that of FIG. 5 illustrating response of the CVT and the virtual gear ratios when the locking mechanism is activated while the power source speed is constrained by the minimum and maximum power source limits.

Referring to FIGS. 10 and 11, there are illustrated embodiments of a power source map 300 and a virtual gear map 320 representing the effect of activating the locking mechanism when the power source speed is equivalent to the maximum power source limit. Specifically, FIG. 10 represents the range of available power source speeds 302 along the Y-axis with respect to the plurality of virtual gear ratios 304 along the X-axis as constrained by the minimum power source limit 306 and the maximum power source limit 308. The operator may lock the power source speed 310 (indicated as a dashed line with arrows) to the maximum power source limit 308 for all virtual gear ratios 304. For example, the power source speed 310 may be approximately 1850 RPM between virtual gear ratios (1)-(4) and may decrease to 1650 RPM between virtual gear ratios (4)-(8). The power source speed 310 thus accounts for the variations in the maximum power source limit 308. Further, as depicted in the power source map 300, the curve of the power source speed 310 aligns with the curve of the maximum power source limit 308 for all virtual gear ratios. In this embodiment, no delta exists because power source speed 310 and the maximum power source limit 308 are equal at all virtual gear ratios.

Referring to FIG. 11, the embodiment of the virtual gear map 320 relates the virtual gear ratios 322 along the Y-axis to the ranges of possible CVT output speeds 324 along on the X-axis. The virtual gear map 320 may also include a curve representing the minimum CVT speed curve 326 and a curve representing the maximum CVT speed curve 328. Because the power source speed is locked at the maximum power source limit for all virtual gear ratios, the curve representing the CVT output speed curve 330 (indicated as a dashed line with arrows) substantially aligns with the maximum virtual gear speed 328. Thus, the speed output from the CVT and the resulting machine speed should be the maximum speed possible for each virtual gear ratio. Alternatively, if the power source gear speed 310 is locked with respect to the minimum power source limit 306, the CVT output speed curve 330 may align with the minimum CVT speed curve 326.

INDUSTRIAL APPLICABILITY

In accordance with an aspect of the disclosure, a machine may be equipped with a lock mechanism 122 as illustrated in FIG. 3 that functions as a throttle lock or similar device. The operator may engage the lock mechanism 122 so that an operator input signal resulting from modulation of the first pedal 120 may be locked as a sustained input. With the lock mechanism 122 engaged, the operator is not required to hold the pedal position for extended periods of time that may fatigue the operator. Referring to FIGS. 3, 4, and 5, the machine may also be equipped with a power source 106 such as an internal combustion engine that may produce a power output or output speed that may be constrained by a high idle or maximum power source limit 206 and a low idle or minimum power source limit 208. The rotational output of the power source 106 may be transmitted through a CVT 110 to propulsion devices 159 such as wheels to propel the machine. To simulate the operation of conventional gear-based transmission, the CVT 110 may be associated with a plurality of virtual gear ratios 212. In some embodiments, the operator may attempt to shift the virtual gear ratios with the lock mechanism engaged. Because the minimum and maximum power source 206, 208 limits may vary with respect to different virtual gear ratios 204, the power source speed the operator locked at may not be applicable or proper for the newly selected virtual gear ratios. Accordingly, a controller 190 operatively associated with the machine may be programmed with various executable control maps to simultaneously regulate the power source and CVT in a cooperative manner to account for the various operational limitations and constraints.

Figure 12:
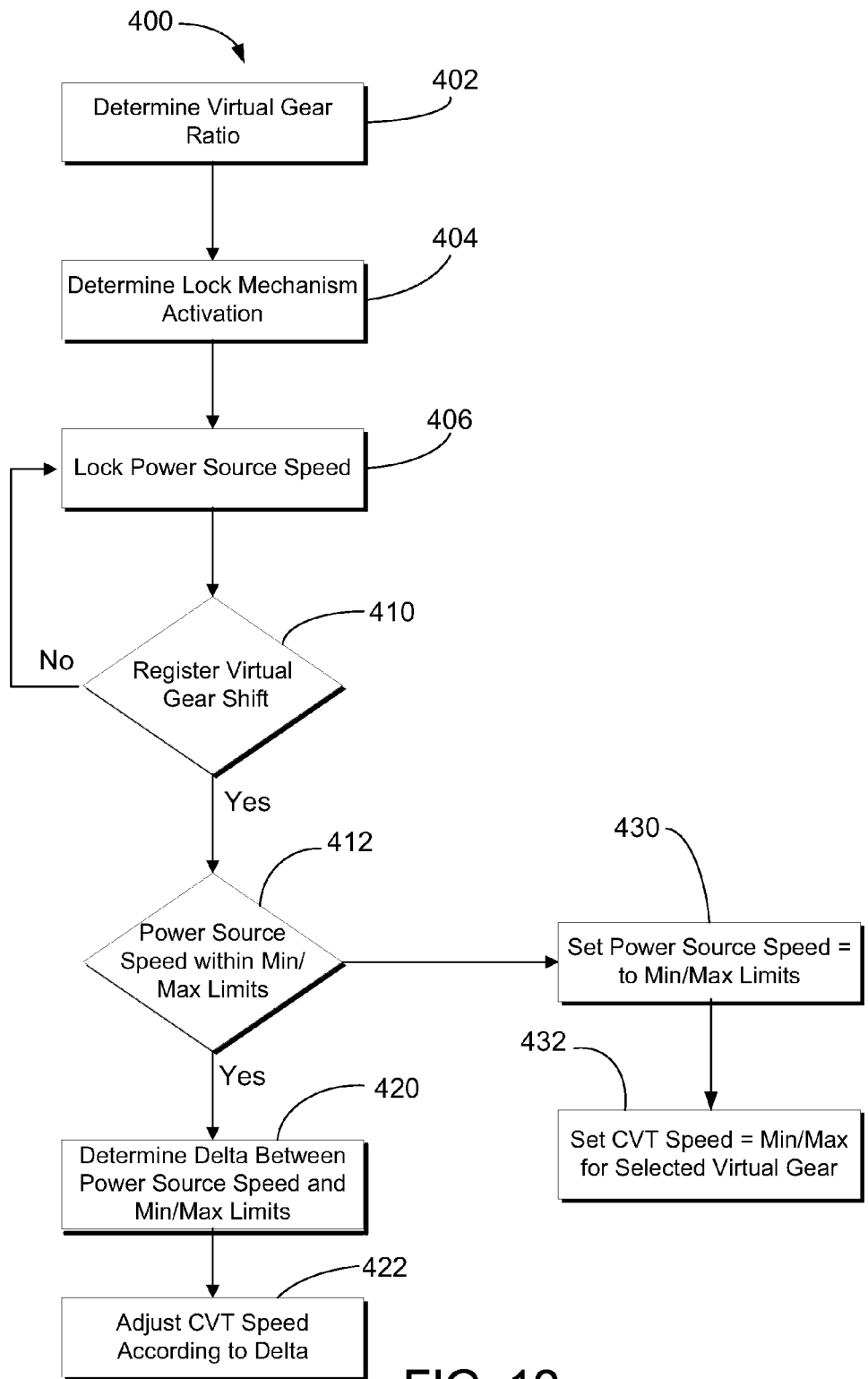
FIG. 12 is a flowchart illustrating a possible routine or process for regulating response of a power source and a CVT concurrently with an activated throttle locking mechanism.

Referring to FIG. 12, there is illustrated an embodiment of a flowchart 400 representing a process for controlling operation of the power source and CVT in accordance with the disclosure. In a virtual gear determination step 402, the process may determine if the operator has selected a particular virtual gear ratio from the plurality of virtual gear ratios. In a lock mechanism determination step 404, the process determines if the operator has activated the lock mechanism signaling the desire to maintain a constant or consistent output from the power source. If the lock mechanism is activated, the process may perform a lock step 406 that locks or sets the output speed of the power source at a constant RPM in a manner that simulates a throttle lock. The process thereafter automatically regulates the output speed of the power source without the direction of operator input signals produced by modulation of the first pedal.

To determine if the operator has changed the virtual gear ratio, for example, to increase the machine speed without modulating the first pedal, the process may perform a gear shift registration step 410. If the virtual gear ratio has not changed, the gear shift registration step 410 may return to the lock step 406 and continue to regulate the power source at the locked power source speed. If, however, the virtual gear ratio has changed, the process may perform a limit determination step 412 to determine if the power source speed is properly within the variable minimum and maximum power source limits for the newly selected virtual gear ratio. To assist the limit determination step 412, the process may utilize power source maps such as those illustrated in FIGS. 6, 8, and 10. If the power source speed is within the minimum and maximum power source limits associated with the newly selected virtual gear ratio, the process may proceed to adjust the speed being output by the CVT.

In an embodiment, to correlate the adjusted CVT output speed and power source speed within their respective ranges, the process may perform a delta calculation step 420. Specifically, the delta calculation step 420 determines the power source speed relative to the range of power source speeds available for the newly selected virtual gear ratio. The delta may be expressed as a percentage, ratio or degree. Once the delta is determined, the process 400 may perform a CVT output speed adjustment step 422 in which the delta is applied to a virtual gear map such as those representatively illustrated in FIGS. 7, 9, and 11. Specifically, the delta and the virtual gear speed range available for the selected virtual gear ratio are multiplied to arrive at a CVT output speed. Moreover, the CVT output speed may be limited by a minimum and maximum CVT output speed curves corresponding to the selected virtual gear ratio so that the CVT simulates a conventional gear-based transmission.

If, however, the limit determination step 412 determines the power source speed is at or outside the range of the minimum or maximum power source limits, the process 400 may include a power source limitation step 430 that may limit or constrain the power source speed within the given limits. Specifically, the output speed of the power source is accordingly set to the minimum or maximum power source limit. Further, the process in a CVT limitation step 432 may set the speed being output by the CVT accordingly to the minimum or maximum CVT speed curves as they correspond to the selected virtual gear ratio. Setting the output speed of the CVT to the minimum and/or maximum CVT speeds reflects that a delta does not exist as a fraction or percentage in situations where the power source speed is at or outside of the minimum or maximum power source limits.

Accordingly, the disclosure provides a throttle lock useable with a CVT operatively coupled to a power source to help control the operational speed of the power source. A possible advantage of the disclosed system is that it facilitates use of a power source having variable minimum and maximum power source limits with a CVT associated with an adjustable plurality of virtual gear ratios. A related advantage is that the disclosure may prevent the power source from stalling or redlining even if the operator shifts through the plurality of virtual gear ratios.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A method of regulating speed of a machine including a continuously variable transmission (CVT) operatively coupled to a power source; the method comprising:

selecting a first virtual gear ratio from a plurality of virtual gear ratios associated with the CVT;

receiving an operator input signal commanding a CVT output speed associated with the first virtual gear ratio;

locking a power source speed between a minimum power source limit and a maximum power source limit related to the first virtual gear ratio;

shifting from the first virtual gear ratio to a second virtual gear ratio to change the CVT output speed;

comparing the power source speed to the minimum power source limit and the maximum power source limit related to the second virtual gear ratio; and responsively limiting the power source speed if outside the minimum power source limit or the maximum power source limit related to the second virtual gear ratio to fall between the minimum power source limit and maximum power source limit associated with the second virtual gear ratio.

2. The method of claim 1, wherein the minimum power source limit and the maximum power source limit vary with respect to the plurality of virtual gear ratios.

3. The method of claim 2, further comprising maintaining the power source speed if not outside the minimum power source limit and the maximum power source limit for the second virtual gear ratio.

4. The method of claim 3, wherein each virtual gear ratio of the plurality of virtual gear ratios includes a range of virtual gear speeds between a minimum virtual gear speed and a maximum virtual gear speed.

5. The method of claim 4, wherein the minimum virtual gear speed for each of the plurality of virtual gear ratios collectively provides a minimum CVT speed curve; and the maximum virtual gear speed for each of the plurality of virtual gear ratios collectively provides a maximum CVT speed curve.

6. The method of claim 5, further comprising determining a delta representing a difference between the power source speed as locked and at least one of the minimum power source limit and the maximum power source limit.

7. The method of claim 6, further comprising applying the delta to the range of virtual gear speeds for the second virtual gear ratio to determine the CVT output speed.

8. A machine comprising:
a continuously variable transmission (CVT) associated with a plurality of virtual gear ratios;
a virtual gear shifter for selecting a virtual gear ratio from the plurality of virtual gear ratios;
a power source operatively coupled to the CVT, the power source associated with a minimum power source limit and a maximum power source limit;
a lock mechanism for locking a power source speed between the minimum power source limit and the maximum power source limit for the virtual gear ratio selected;
a controller communicating with the CVT, the power source, the virtual gear shifter and the lock mechanism, the controller including a power source map relating the maximum power source limit and the minimum power source limit to the plurality of virtual gear ratios, the controller limiting the power source speed to fall between the minimum power source limit and the maximum power source limit if the virtual gear ratio changes.

9. The machine of claim 8, where changing the virtual gear ratio changes a CVT output speed.

10. The machine of claim 9, wherein each of the plurality of virtual gear ratios includes a range of virtual gear speeds between a minimum virtual gear speed and a maximum virtual gear speed.

11. The machine of claim 10, wherein the minimum virtual gear speed for each of the plurality of virtual gear ratios together provides a minimum CVT speed curve; and the maximum virtual gear speed for each of the plurality of virtual gear ratios together provides a maximum CVT speed curve.

12. The machine of claim 11, wherein the CVT output speed is limited by the minimum CVT speed curve and the maximum CVT speed curve.

13. The machine of claim 12, wherein the minimum power source limit and the maximum power source limit vary with the plurality of virtual gear ratios.

14. The machine of claim 13, wherein the controller determines a delta representing a difference between the power source speed as locked and at least one of the minimum power source limit and the maximum power source limit.

15. The machine of claim 14, wherein the controller applies the delta to at least one of the minimum CVT speed curve and the maximum CVT speed curve to determine the CVT output speed.

16. A method of controlling speed of a machine having a power source operatively coupled to a continuously variable transmission (CVT) associated with a plurality of virtual gear ratios, the method comprising:
locking the power source at a power source speed;
comparing the power source speed as locked to a power source map including a minimum power source limit and a maximum power source limit associated with the power source;
determining a delta representing difference between the power source speed as locked and at least one of the minimum power source limit and the maximum power source limit from the step of comparing; and
applying the delta to a virtual gear map to determine a CVT output speed.

17. The method of claim 16, wherein the virtual gear map includes a minimum CVT speed curve and a maximum CVT speed curve that limit the CVT output speed.

18. The method of claim 17, where the virtual gear map includes for each virtual gear ratio of the plurality of virtual gear ratios a range of virtual gear speeds between a minimum virtual gear speed and a maximum virtual gear speed.

19. The method of claim 18, wherein the minimum CVT speed curve is determined by plotting together the minimum virtual gear speed for each of the plurality of virtual gear ratios; and the maximum CVT speed curve is determined by plotting together the maximum virtual gear speed for each of the plurality of virtual gear ratios.

20. The method of claim 16, wherein power source map associates the minimum power source limit and the maximum power source limit the plurality of virtual gear ratios, and the minimum power source limit and the maximum power source limit vary with respect to the plurality of virtual gear ratios.

* * * * *